United States Patent
Dzafic et al.

(10) Patent No.: US 10,480,631 B2
(45) Date of Patent: Nov. 19, 2019

(54) MODULAR ELECTRIC DRIVE AXLE

(71) Applicant: Volvo Car Corporation, Göteborg (SE)

(72) Inventors: Ahmet Dzafic, Mölndal (SE); Mathias Jörgensson, Stenungsund (SE); Thomas Weiland, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/104,356

(22) Filed: Aug. 17, 2018

(65) Prior Publication Data
US 2019/0078674 A1    Mar. 14, 2019

(30) Foreign Application Priority Data

Sep. 14, 2017 (EP) ..................................... 17191013

(51) Int. Cl.
*F16H 37/08* (2006.01)
*F16H 57/025* (2012.01)
(Continued)

(52) U.S. Cl.
CPC ............. *F16H 37/082* (2013.01); *B60K 1/00* (2013.01); *B60K 7/0007* (2013.01); *F16H 1/28* (2013.01);
(Continued)

(58) Field of Classification Search
None
See application file for complete search history.

(56) References Cited

U.S. PATENT DOCUMENTS

| | | | |
|---|---|---|---|
| 5,718,300 A * | 2/1998 | Frost | B60K 1/00 180/297 |
| 6,074,321 A * | 6/2000 | Maeda | B60K 1/00 475/221 |

(Continued)

FOREIGN PATENT DOCUMENTS

| | | |
|---|---|---|
| DE | 2011018861 A1 | 10/2012 |
| DE | 2014220347 A1 | 4/2016 |
| DE | 2016200066 A1 | 7/2016 |

OTHER PUBLICATIONS

Mar. 15, 2018 European Search Report issue on International Application No. EP17191013.6.

*Primary Examiner* — Colby M Hansen
(74) *Attorney, Agent, or Firm* — Clements Bernard Walker; Christopher L. Bernard

(57) ABSTRACT

An electric drive axle, including: a first and a second drive shaft being axially aligned, an electric drive module and a differential module, wherein the electric drive module includes an electric motor and a planetary gear set, wherein both the electric motor and the planetary gear set are coaxially arranged about the drive shafts, wherein output means of the electric drive module is connected to input means of the differential module, wherein the input means is or can be set in drive connection with the drive shafts, such that a drive force generated by the electric drive module can be transferred to the first and/or second drive shaft, and a coupling between the output means and the input means, wherein the coupling is arranged to allow for the output means and the input means to slide into engagement in an axial direction.

12 Claims, 4 Drawing Sheets

(51) Int. Cl.
*F16H 48/19* (2012.01)
*F16H 1/28* (2006.01)
*H02K 7/116* (2006.01)
*B60K 7/00* (2006.01)
*F16H 57/037* (2012.01)
*F16H 57/029* (2012.01)
*F16H 48/08* (2006.01)
*F16H 48/10* (2012.01)
*H02K 7/00* (2006.01)
*B60K 1/00* (2006.01)
*F16H 57/02* (2012.01)

(52) U.S. Cl.
CPC ............ *F16H 48/08* (2013.01); *F16H 48/10* (2013.01); *F16H 48/19* (2013.01); *F16H 57/025* (2013.01); *F16H 57/029* (2013.01); *F16H 57/037* (2013.01); *H02K 7/006* (2013.01); *H02K 7/116* (2013.01); *B60K 2007/0061* (2013.01); *F16H 2001/2881* (2013.01); *F16H 2057/02034* (2013.01); *H02K 2213/12* (2013.01)

(56) References Cited

U.S. PATENT DOCUMENTS

| | | | |
|---|---|---|---|
| 6,378,638 B1* | 4/2002 | Mizon | B60K 6/26 180/65.6 |
| 7,247,117 B2* | 7/2007 | Forster | B60K 17/046 180/65.6 |
| 7,549,940 B2* | 6/2009 | Kira | B60K 6/36 475/204 |
| 8,870,698 B2* | 10/2014 | Mack | B60L 50/16 475/150 |
| 2003/0037977 A1 | 2/2003 | Tatara et al. | |
| 2005/0099146 A1 | 5/2005 | Nishikawa et al. | |
| 2014/0296028 A1 | 10/2014 | Joeng | |

* cited by examiner

MODULAR ELECTRIC DRIVE AXLE

CROSS-REFERENCE TO RELATED APPLICATION

The present patent application/patent claims the benefit of priority of co-pending European Patent Application No. 17191013.6, filed on Sep. 14, 2017, and entitled "MODULAR ELECTRIC DRIVE AXLE," the contents of which are incorporated in full by reference herein.

TECHNICAL FIELD

The present invention relates to the field of vehicles, and especially to hybrid or electric vehicles, where at least one axle is electrically driven. The present invention further relates to a modular electric drive axle including an electric drive module and a differential module, where the differential module can be exchanged dependent on the demands upon the vehicle that the drive axle is designated for.

BACKGROUND ART

New propulsion technologies for vehicles have evolved during the last decade, where the traditional combustion engine is supported or even replaced by alternative drive sources, such as electric motors, giving new possibilities and demands on the arrangement of the drive sources. Especially in hybrid vehicles provided with two different propulsion devices, there is a space shortage. For example, a hybrid vehicle with a combustion engine and an electric motor must be equipped with e.g. both an electric motor and batteries in addition to the traditional combustion engine. There are also modern vehicles full with auxiliary systems, such as navigation facilities, active safety equipment and much more, whereby packing space becomes a very important issue in addition to weight and fuel consumption. A high packing density in a vehicle gives more room for passenger and/or luggage compartments and low weight and gives a lower fuel consumption, whereby the vehicle's environmental strain is reduced.

Further, customers have different demands, whereby a wide range of customisation possibilities must be offered for each vehicle in order to meet the variety of demands.

SUMMARY OF THE INVENTION

It is an object of the disclosure to present a vehicle and an electric drive axle for a vehicle which enables a high packing density and high customisation possibilities.

A drive axle of a vehicle is normally provided with a differential in order to distribute the drive force between the first and the second drive shaft.

An electric drive axle of a vehicle provided with just one drive source must also be provided with a differential gear in order to allow the left and right drive shafts to rotate at different speeds. As an electric drive axle needs the drive source, probably a reduction gear and a differential gear added to the axle, the packing space for a vehicle with an electric drive axle becomes crucial. Additional features, such as torque vectoring and/or a multiple-mode and/or stepped gear, can also be desirable.

The present disclosure therefore suggests an electric drive axle with two modules that can be combined freely dependent on the customer demands.

The electric drive axle includes a left and a right drive shaft being axially aligned, an electric drive module and a differential module, wherein the electric drive module includes an electric motor and a planetary gear set, wherein both the electric motor and the planetary gear set are coaxially arranged about the drive shafts, wherein output means of the electric drive module is connected to input means of the differential module, wherein the input means is or can be set in drive connection with the right and left drive shaft, such that a drive force generated by the electric drive module can be transferred to the first and/or second drive shaft, wherein the electric drive axle includes a coupling between the output means and the input means, wherein the coupling is arranged to allow for the output means and the input means to slide into engagement in an axial direction.

An exemplary effect of the electrical drive axle is that the differential module can easily be exchanged in order to meet customer specifications upon the electrical drive axle. With one specified electrical drive module, different properties of the electrical drive axle can be achieved by varying the differential module. By providing a differential module with the desired property, such as compactness, additional drive modes, torque vectoring and/or additional reduction gears can be provided.

The first and the second drive shafts correspond to the left and the right drive shaft of a drive axle or correspondently right and left drive shafts if a mirrored layout of the drive axle is desired.

The planetary gear set includes a sun gear, a planet carrier with planet gears and a ring gear, where the sun gear is the input part connected to the electric drive source, the ring gear is fixedly connected a stationary part, i.e. the ring gear is stationary and the planet carrier is the output part.

The planetary gear set can be a normal planetary gear set or a compound planetary gear set with composite planet gears. For example, each composite planet gear can be a pair of rigidly connected and longitudinally arranged gears of different radius, where one of the two gears engages the centrally located sun gear, while the other engages the outer ring gear. The planets are normally arranged so that they can be rotatable upon the planet carrier.

The output means of the electric drive module can be a gear, a shaft or planet carrier or any other suitable part connected to the output part of the planetary gear set. The input means of the differential module can be a gear or a shaft or any other suitable part connected to the input part (sun gear) of the planetary gear set and thereby input part of the differential module.

The coupling includes a first coupling part arranged upon the output means of the electric drive module and a second coupling part arranged upon the input means of the differential module. A suitable coupling type is a splines coupling.

In one exemplary version of the electric drive axle, the electric drive module and the differential module are provided with separate housings and seals are provided between the electric drive modules output means and/or the differential modules input means and one of the housings, such that each housing is a separate sealed volume.

Exemplary positions for the seals are between the differential module's housing and the differential module's input shaft and between the drive shaft and the differential module's input shaft, as well as between the electrical drive module's output means and the housing of the electrical drive module and between the drive shaft and the electrical drive module's output shaft.

Exemplary effects of providing seals and housings of the electrical drive module and the differential module such that the electrical drive module and the differential module become separate sealed volumes are that each volume can separately be filled with a lubrication, such as oil or grease or different qualities of oil and grease, whereas different lubrications can be used for the two separate volumes.

In one exemplary electric drive axle, the housing of the electric drive module is provided with an attachment flange at its output side and the housing of the differential module is provided with an attachment flange at its input side, whereby the attachment flanges are fixedly arranged towards each other.

One exemplary effect of the attachment flanges is that the two modules can easily be attached to each other.

In one exemplary electric drive axle, the coupling is provided inside the housing of the electric drive module.

In another exemplary electric drive axle, the coupling is axially provided between two seals where the first seal seals between the output means and the housing of the electric drive module and the second seal seals between the input means and the housing of the differential module.

An exemplary effect of providing the coupling between two seals, which seals against the housing of the electrical drive module and the differential module, respectively, is that the coupling is arranged outside both of the sealed volumes constituted of the two housings. Both the electrical drive module and the differential module can thereby be filled with their respective lubrication before the two modules have been attached to each other.

In one exemplary electric drive axle, the coupling is a splines coupling.

In one exemplary electric drive axle, the differential module includes a standard differential with bevel gears, where the input gear of the differential gear is connected to the input means of the differential module.

In one exemplary electric drive axle, the differential module includes a double clutch differential, wherein a first clutch connects to the first drive shaft and a second clutch connects to the second drive shaft. Each clutch can be controlled individually. One exemplary effect of providing a double clutch differential in the differential module is that it enables torque vectoring of the electric drive axle.

In one exemplary electric drive axle, the differential module includes a planetary differential. One exemplary effect of providing a planetary differential in the differential module is that the planetary differential is very compact, whereby space for additional planetary gears becomes available. An electrical drive axle with a differential module with a planetary differential can provide a higher gear reduction and or additional drive modes without increasing the axial and radial space consumption of the electric drive axle.

In one exemplary electric drive axle, the differential module further includes an additional planetary gear set, wherein the additional planetary gear set the sun gear connects to the input means of the differential module and the ring gear connects to the housing via a selectable one-way clutch and the planet carrier connects to the planet carrier of the planetary differential. One exemplary effect of providing the differential module with a planetary gear set according to the above is that it provides two driving modes, a first drive mode and a second free wheel mode, where the electrical drive source is disconnected from the drive shafts. In one exemplary drive axle, the differential module includes an additional planetary gear sets arranged to have different gear speeds.

The disclosure also concerns an exemplary vehicle provided with an electric drive axle according to this disclosure.

The disclosure also concerns a method to assemble an electric drive axle, wherein the electric drive module is assembled upon a first drive shaft and the differential module is assembled upon a second drive shaft, whereby to engage the input means of the differential module with the output means of the electric drive module, one slides the input means and the output means together in axial direction such that the coupling is engaged and fastens the attachment flanges to each other.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure. All drawings are schematic.

Figure 1:
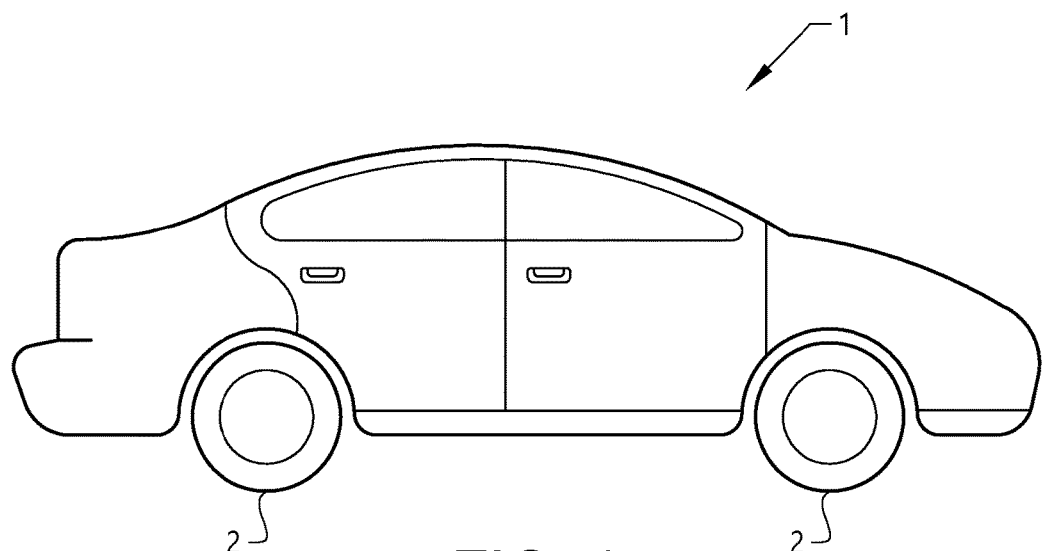
FIG. 1 discloses a schematic view of a vehicle.
Figure 2:
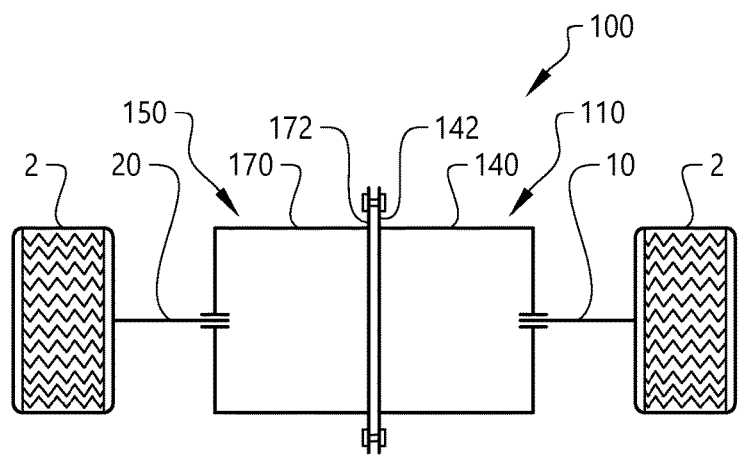
FIG. 2 discloses a schematic view of an exemplary electric drive axle.

FIG. 1 discloses a schematic view of a vehicle 1 which may be provided with an electric drive axle 100. In FIG. 2, an exemplary electric drive axle 100 is disclosed, the electric drive axle 100 includes a first and second drive shaft 10, 20 for connection to a right and left drive wheel 2 of the vehicle 1. The electric drive axle 100 includes an electric drive module 110 and a differential module 150. In the exemplary drive axle 100 of FIG. 2, the electric drive module 110 and the differential module 150 are attached to each other at attachment flanges 142, 172, which are bolted together with attachment means 173. The attachment means 173 can, for example, be bolts, screws, clamping means, form or press fittings or any other suitable attachment means.

Figure 3:
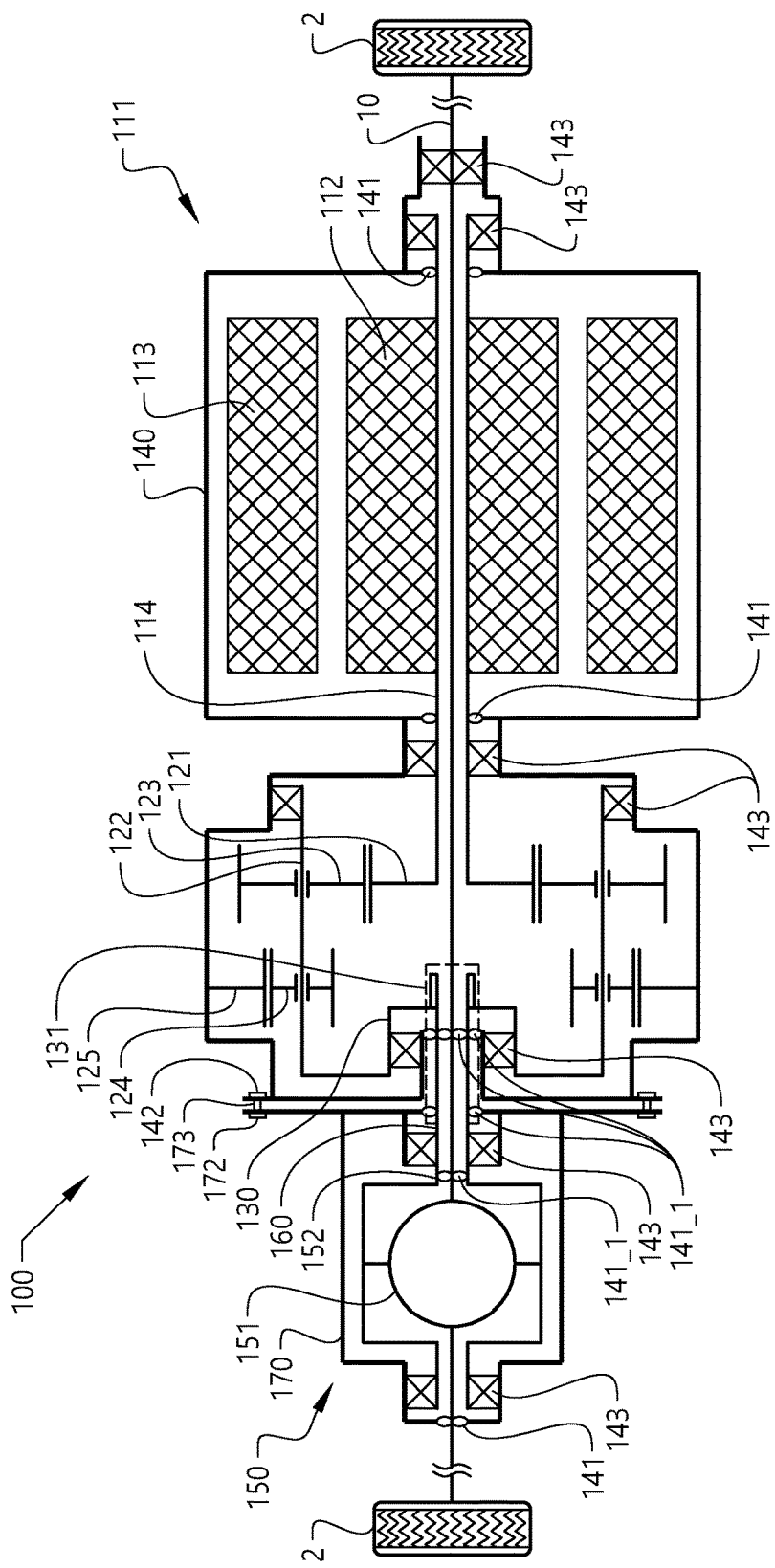
FIG. 3 discloses a schematic view of an exemplary electric drive axle.
Figure 4:
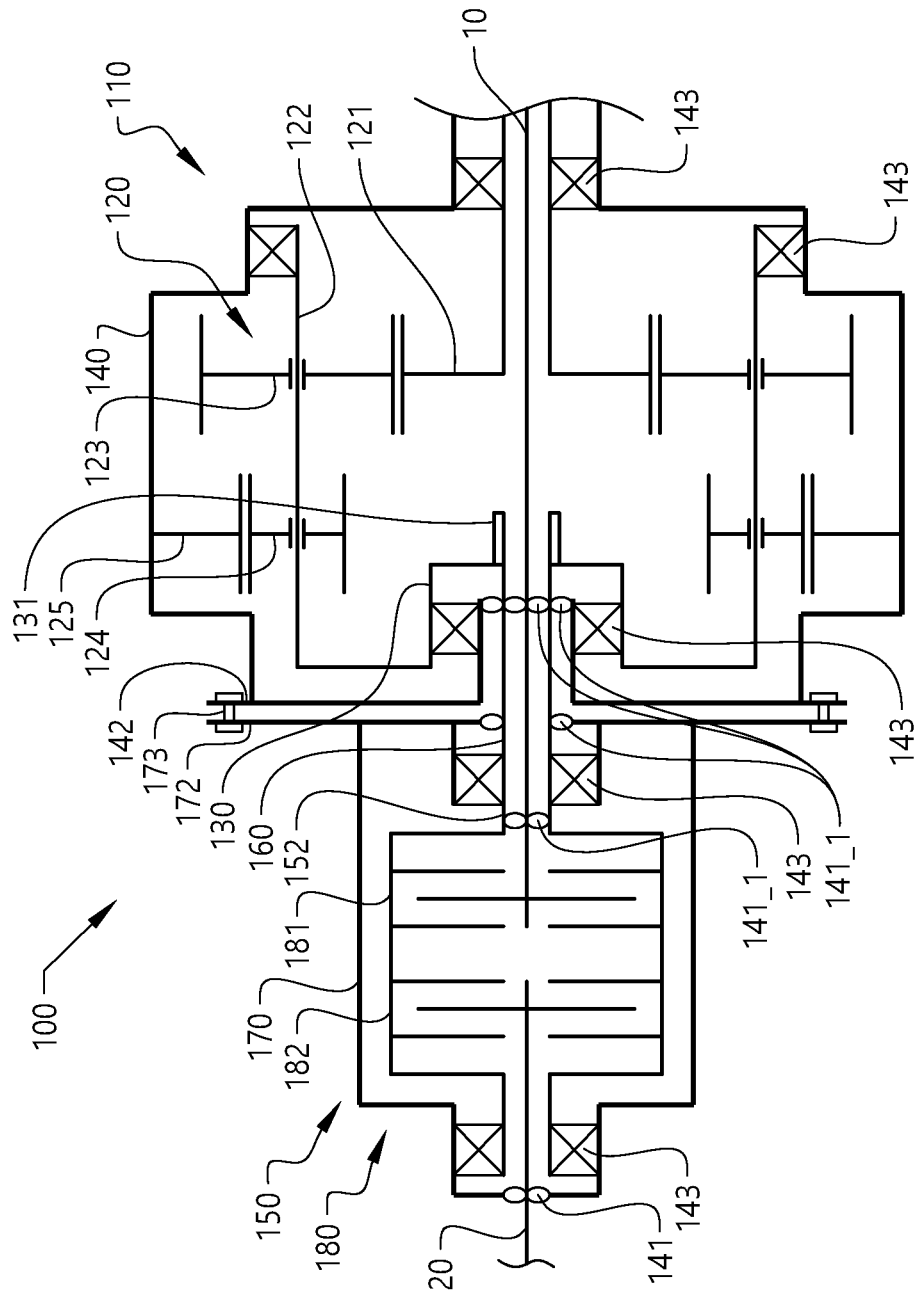
FIG. 4 discloses a schematic view of an exemplary electric drive axle.
Figure 5:
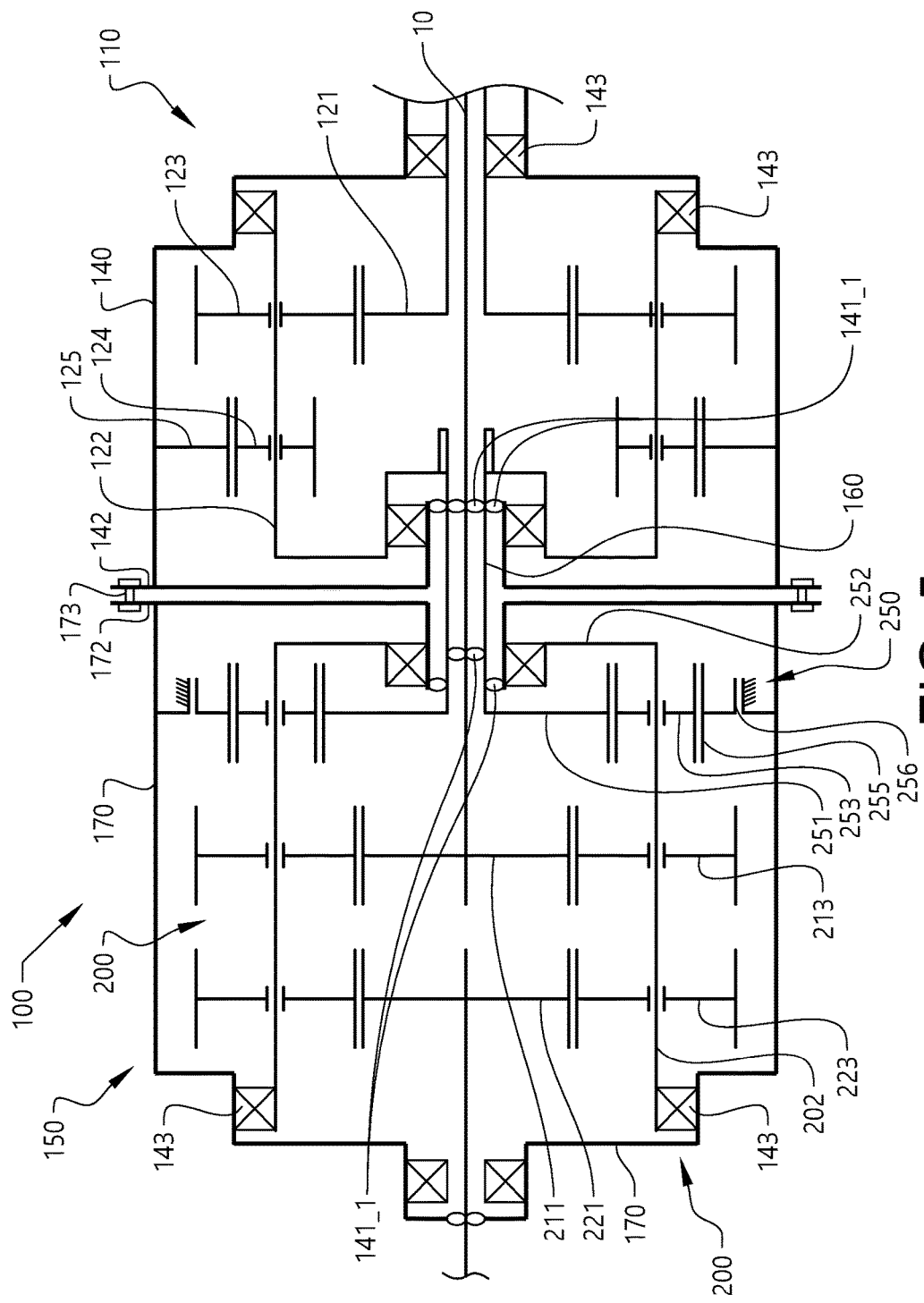
FIG. 5 discloses a schematic view of an exemplary electric drive axle.

FIGS. 3-5 disclose three different exemplary electric drive axles 100. The bearings 143 and the seals 141 disclosed in FIGS. 3-5 are all symbolically disclosed. The bearings 143 and the seals 141 are provided at exemplary and non-limiting positions. Non-limiting exemplary common bearing types are different ball bearings, roller bearings and glide bearings. Bearings 143 can also be provided with seals in combination with seals 141 or as a replacement for seals 141.

FIG. 3 discloses a more detailed view of an electric drive axle 100, with the electric drive module 110 to the right in the figure and the differential module 150 to the left in the figure. The differential 151 in the differential module 150 is in FIG. 3 only symbolically disclosed.

In the exemplary electric drive axles 100 disclosed in FIGS. 2-5, the differential module 150 and the electric drive module 110 are provided coaxial with the two axial aligned drive shafts 10, 20.

The electric drive module 110 disclosed in FIGS. 3-5 includes an electric motor/generator 111 (hereafter only referred to as an electric motor), a planetary gear set 120 and a housing 140.

The housing 140 can be provided to hold both the electric motor 111 and the planetary gear set 120 in one housing 140 or be divided into separate housing components that together form the housing 140. The electric drive module 110 is provided with seals 141, 141_1 that seal between the housing 140 and rotational shafts 10, 114, 152 that extend out from the housing 140 such that the housing 140 forms a closed volume. The housing 140 can thereby be filled with a lubricant, such as an oil or grease, in order to lubricate the rotating parts therein.

The electric motor 111 includes a rotor 112 and a stator 113, whereby the stator 113 preferably is connected to the stator housing 140. The rotor 112 includes a rotor shaft 114 which is in direct connection with the sun gear 121 of the planetary gear set 120.

The planetary gear set 120 includes a sun gear 121, a planet carrier 122 with planets 123, 124 and a ring gear 125. In the exemplary electric drive modules 110 disclosed in FIGS. 3-5, the planetary gear set 120 is a compound planetary gear set with composite planet gears 123, 124. The composite planets include a pair of first and second planet gears 123, 124, which are rigidly connected in their axial directions and arranged upon the planet carrier 122 such that they can rotate thereupon. The first planet gear 123 meshes with the sun gear 121 and the second planet gear 124 meshes with the ring gear 125. The first and second planet gears 123, 124 have different radii, whereby a planetary gear set with a higher gear ratio can be achieved in a small space. The electric drive module 110 can, for example, be provided with planetary gear set 120 with a normal set of planetary gears and or another suitable planetary gear set dependent of the requirements of the electric drive module 110.

The electric motor 111 can be sealed from the planetary gear set 120 in the electric drive module 110, in order to create a sealed-for-life environment for the planetary gear set 120. In the sealed-for-life environment, all the lubrication that is needed for the life cycle of the planetary gear set 120 is provided already at manufacturing of the electrical drive module 110.

The planet carrier 122 is an output part 130 and connects directly or indirectly to the input part 160 of the differential module 150.

The differential module 150 includes at least a differential 151 (in FIG. 3 only symbolically disclosed) with an input part 160. The differential 151 distributes the drive force from the input part 160 to the first and second drive shafts 10, 20. The differential 151 of the module 150 is provided in a stationary housing 170, which connects to the housing 140 of the electric drive module 110. The differential module 150 is provided with seals 141, 141_1 that seal between the housing 170 and rotational shafts 20, 114, 152 that extend out from the housing 170, such that the housing 140 forms a closed volume. The housing 170 can thereby be filled with a lubricant, such as an oil or grease, in order to lubricate the rotating parts therein.

The interface between the electric drive module 110 and the differential module 150 includes the attachment flanges 142, 172 of the respective housings 140, 170 and the coupling 131 between the output part 130 of the electric drive module 110 and the input part 160 of the differential module 150.

In FIGS. 3-5, the coupling 131 is placed in between the planet carrier 130 and the input shaft 152 of the differential module 150, directly after the planet carrier 130. The coupling 131 is thereby arranged inside the housing 140 of the electric drive module 110. The planet carrier 130 becomes the output part 131 and the input shaft 152 is the input part 16.

In FIG. 3, a dashed box 135 is drawn in the figure. The dashed box 135 shows a generally suitable location of the coupling 131, i.e. the coupling 131 can be, but must not necessarily be, provided in the interface between the planet carrier 122 and the input part 160 of the differential module 150. An exemplary different position within the dashed box 135 is between the seals 141_1 that seal the respective module 110, 150, such that the coupling 131 is placed outside the respective sealed space. Respective module 110, 150 can thereby be sealed and optionally filled with lubricant before they are attached to each other.

When the electric drive module 110 and the differential module 150 are engaged, the attachment flanges 142, 172 of respective housings 140, 170 face each other and are attached to each other through the attachment means 173. The attachment means 173 can be screws, bolts, clamping means or any other suitable attachment means.

FIG. 4 discloses an exemplary drive axle 100 provided with a differential module 150 including a double clutch 180 as a differential. The double clutch 180 includes a first clutch 181 connected to the first drive shaft 10 and a second clutch 182 connected to the second drive shaft 20. By providing a double clutch 180 as differential in the electric drive axle 100, torque vectoring can be achieved by individual control of the two clutches 181, 182.

FIG. 5 discloses an exemplary drive axle 100 provided with a differential module 150 including a planetary differential 200 and an additional planetary gear set 250. The planetary differential 200 includes a first and a second sun wheel 211, 221 arranged upon the first and the second drive shaft 10, 11. The first and the second sun wheels 211, 221 mesh with a first and a second planet 213, 223 which are arranged upon the common planet carrier 202 such that they can rotate thereupon. The planet carrier 202 acts as the input part to the differential 200. In the exemplary drive axle 100 disclosed in FIG. 5, the planet carrier 202 of the differential 200 is also common with the planet carrier 252 of an additional planetary gear set 250.

The additional planetary gear set 250 includes a sun wheel 251 which connects to the input shaft 152 of the differential module 150, a planet carrier 252, which is common with planet carrier of the differential 200, planet gears 253 arranged upon the planet carrier 252 and a ring gear 255. The ring gear 255 is connected to the housing 170 through a freewheel 253, which can be controlled to be locked or open.

In its locked position, the freewheel 253 locks the ring gear 255 to the stationary housing 170. In its open position, the freewheel 253 lets the ring gear 255 turn independent of the stationary housing 170. An exemplary effect of the freewheel 256 is that the electrical motor 111 can be disconnected from the drive shafts 10, 20. In a vehicle application, this could, for example, be used to disconnect an electrical motor 111 at higher speeds.

An exemplary effect of the planetary differential 200 is that it is axial compact, which can be used to add additional reduction gears to the electrical drive axle 100. In the exemplary electrical drive axle 100 disclosed in FIG. 5, the extra space is used to incorporate an additional planetary gear set 250 with the freewheel 256.

Dependent on the packing space available in the vehicle, the electric drive axle 100 is designated for different combination of differentials and planetary gears can be provided in the differential module 150 and/or electrical drive module 110 dependent on the requirements of the customer. The modules 110, 150 are, however, always provided with a coupling 130 enabling the axial sliding engagement of the electrical drive module 110 with the differential module 150. An exemplary coupling 130 is a splines coupling. Independent which configuration of electrical drive module 110 that is used as a standard configuration, for example the configuration disclosed in FIGS. 3-5, the electrical drive module 110 can easily be fitted with a differential module 150 that meets the requirements of the customer. A differential module 150 can be chosen to meet requirements in packing space, torque vectoring, additional reduction ratio, e-motor disconnect capability and/or additional gear steps.

Exemplary electrical drive axles are disclosed in FIGS. 3-5. Features such as types of planetary gears, gear ratio, freewheels and variable gears can be altered without departing from the scope of this disclosure.

What is claimed is:

1. An electric drive axle, comprising:
    a first and a second drive shaft being axially aligned,
    an electric drive module and a differential module, wherein the electric drive module comprises an electric motor and a planetary gear set, wherein both the electric motor and the planetary gear set are coaxially arranged about the drive shafts, wherein output means of the electric drive module is connected to input means of the differential module, wherein the input means is or can be set in drive connection with the drive shafts, such that a drive force generated by the electric drive module can be transferred to the first and/or second drive shaft, and
    a coupling between the output means and the input means, wherein the coupling is arranged to allow for the output means and the input means to slide into engagement in an axial direction.

2. The electric drive axle according to claim 1, wherein the electric drive module and the differential module are provided with separate housings and seals are provided at least between the electric drive module output means and/or the differential module input means and one of the housings, such that each housing is a separate sealed volume.

3. The electric drive axle according to claim 2, wherein the housing of the electric drive module is provided with an attachment flange at its output side and the housing of the differential module is provided with an attachment flange at its input side, whereby the attachment flanges are fixedly arranged towards each other.

4. The electric drive axle according to claim 2, wherein the coupling is provided inside the housing of the electric drive module.

5. The electric drive axle according to claim 2, wherein the coupling is provided between two seals, where the first seal seals between the output means and the housing of the electric drive module and the second seal seals between the input means and the housing of the differential module.

6. The electric drive axle according to claim 1, wherein the coupling is a splines coupling.

7. The electric drive axle according to claim 1, wherein the differential module comprises a standard differential with bevel gears.

8. The electric drive axle according to claim 1, wherein the differential module comprises a double clutch differential, wherein a first clutch connects to the first drive shaft and a second clutch connects to the second drive shaft.

9. The electric drive axle according to claim 1, wherein the differential module comprises a planetary differential.

10. The electric drive axle according to claim 9, wherein the differential module further comprises an additional planetary gear set, wherein, in the additional planetary gear set, the sun gear connects to the input means of the differential module and the ring gear connects to the housing via a selectable one-way clutch and the planet carrier connects to the planet carrier of the planetary differential.

11. A vehicle provided with the electric drive axle according to claim 1.

12. A method to assemble the electric drive axle according to claim 1, wherein the electric drive module is assembled upon the first drive shaft and the differential module is assembled upon the second drive shaft, thereby connecting the input means of the differential module with the output means of the electric drive module,
    sliding the input means and the output means together in axial direction such that the coupling is engaged, and
    fastening the attachment flanges to each other.

* * * * *